Nov. 27, 1956     W. E. BROWNELL     2,771,924

SURFACE MARKING TOOL

Filed Jan. 29, 1953

WILLIAM E. BROWNELL,
INVENTOR.

BY Eugene C. Knoblock
ATTORNEY.

United States Patent Office 2,771,924
Patented Nov. 27, 1956

2,771,924

SURFACE MARKING TOOL

William E. Brownell, South Bend, Ind.

Application January 29, 1953, Serial No. 334,049

9 Claims. (Cl. 145—25)

This invention relates to improvements in surfacing tools. More particularly the invention relates to a hand tool by means of which the surface of wood, metal, plastic and other materials may be treated for the purpose of grooving, knurling, striating, decorating, engraving, or otherwise treating the same. The tool is particularly well suited for operations of the character known as "checkering" wood surfaces, and for carving.

The primary object of the invention is to provide a tool of this character which is easy to use, which is simple in construction, which may mount tool cutter elements detachably for substitution for different types of work, and in which the attitude or angular position of the tool may be changed or adjusted at will.

A further object is to provide a device of this character in which the cutter of the tool is fully visible at all times, both while pushing and while pulling the same.

A further object is to provide a tool of this character having a novel head detachably mounting a cutting tool in selected tilted or angularly adjusted relation.

A further object is to provide a tool of this character having a novel cutting element which will cut effectively and simple upon movement thereof across a work piece in either of two directions.

Other objects will be apparent from the following specification.

Figure 1:
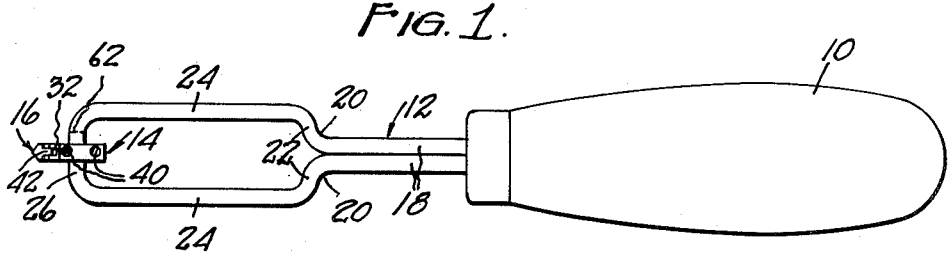
Fig. 1 is a plan view of the device.

Referring to the drawing which illustrates the preferred embodiment of the invention, the numeral 10 designates a handle from which projects a shank 12 carrying a holder 14 at is free or outer end, said holder being adapted to receive a blade or cutter 16.

Figure 2:
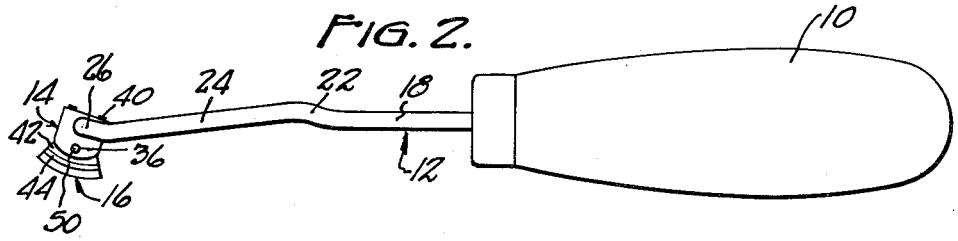
Fig. 2 is an edge or side view of the device.

The shank of the tool is preferably formed from a stiff wire having two juxtaposed substantially parallel longitudinally extending runs 18 projecting substantially axially and centrally from one end of the handle. The wires are bent oppositely outwardly at 20 intermediate the length of the shank to provide divergent runs 22 which also are preferably bent slightly angularly from the plane common to the centers of the shank portion 18, as best illustrated in Fig. 2. Substantially paralled spaced shank portions 24 merge with the diverging portions 22 of the shank, the same preferably extending in a common plane at an angle to the respective planes of the shank parts 18 and the shank parts 20. The shank terminates in a transversely extending portion 26 which preferably lies in a plane at an angle to the plane of the adjoining part 25. The angular relations of the parts are preferably as illustrated in Fig. 2. It will be understood, however, that this angular orientation of the parts, as illustrated in Fig. 2, is not critical or essential and that the entire shank may have different bends or attitudes or may extend in one flat plane throughout.

The head 14 consists of a rigid plate located substantially centrally of the shank part 26 with its longitudinal plane substantially common to a projection of the center of the handle and the shank. The plate has a transverse opening 30 extending therethrough adjacent one end thereof and the shank portion 26 passes through the opening 30, and the parts are fixedly secured together as by welding, brazing, soldering or any other means found suitable. The block or plate 14 is of substantial depth projecting laterally from the shank run 26, as illustrated in Fig. 2. The plate has a longitudinal groove 32 formed in its projecting portion and centrally thereof to define two projecting flanges or jaws 34. The flanges or jaws 34 have an opening 36 formed therein substantially centrally of the longitudinal dimension thereof and intermediate the depth of the groove 32. Two screwthreaded bores 38 are formed in the plate extending in the plane thereof at opposite sides of the transverse bore 30 and communicating with the groove 32. Each of these screwthreaded bores 38 receives an elongated set screw 40.

Figure 5:
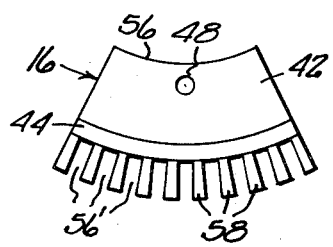
Fig. 5 is an enlarged side view of a cutter.

Each of the cutters 16 has a central attaching web 42 which is of a length substantially equal to the length of the groove 32 of the head 14 and which is of a thickness slightly less than the width of the groove 32. The cutter is of substantially T-shape in cross-section with its outer enlarged or widened portion 44 of substantially arcuate shape as best seen in Fig. 5. An aperture 48 formed in the web 42 serves as a means to receive a pin 50 by means of which the web is attached to the plates 34 of the head. The spacing between the center of the aperture 48 and the shoulder 50 of each cutter is slightly greater than the spacing between the center of the apertures 36 in the flanges 34 from the adjacent free edge 54 of the head 14. In the preferred form the edge 54 of the head will be curved and the arrangement is such that the cutter head 16 may assume various tilted positions with respect to the head without interference from the edge 54 of the head. In this connection it will be observed that the spacing from the center of the aperture 36 to the bottom of the groove 32 of the head is substantially greater than the distance between the center of the aperture 48 and the free edge 56 of each cutter.

Figure 4:
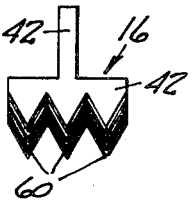
Fig. 4 is an enlarged end view of a cutter.

The outer arcuate portion of each cutter will be preferably provided with a plurality of grooves 56' of equal depth, each extending radially of the head 44 and defining teeth 58 which are symmetrical in each direction. Grooves 56' are preferably of uniform width throughout, as shown in Fig. 4. That is, the reaction of each tooth with the work is the same in each direction of movement, assuming that the tool is held at substantially the same working attitude in both out and in strokes of its reciprocating travel in use. The tip of the cutting head may be of any transverse contour which is desired to be cut in the work piece. Thus as illustrated in Fig. 4, a plurality of longitudinal grooves may be formed so as to provide a plurality of transversely spaced sets of teeth 60. It will be understood, however, that only a single row of teeth may be provided or that two or more teeth may be provided of similar or different configuration.

In the use of the device, the desired cutter 16 is selected and is mounted in the head 14 by passing the pin 50 through the apertures 36 and 48 when the web 42 of the cutter is positioned between the flanges 34 of the head. Assuming that the set screws 40 have first been withdrawn so as to afford free movement or pivoting of the cutter about the pin 50, the set screws will then be adjusted to the desired position, each engaging the edge 56 of the web of the cutter and serving to orient the cutter as a whole in desired position within the slot 32 of the head, and also serving to apply pressure to lock pin 50 against release. The tool is then ready for use.

Figure 3:
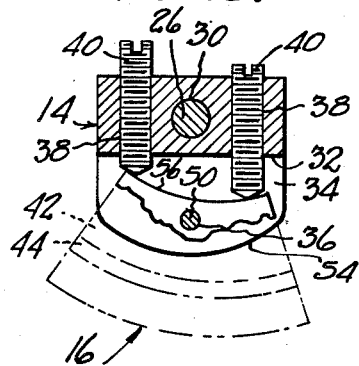
Fig. 3 is an enlarged sectional view of the cutter mounting head of the device.

One of the principal advantages of this device is the fact that the tool affords full vision of the cutter head 16 in use at all times. It will be noted in Figs. 2 and 3 that the cutter is preferably longer than the head so that it projects therefrom slightly at least at each end. These projecting end portions are in full view of the user, as best seen in Fig. 1, by reason of the fact that in looking down on the tool, as viewed in Fig. 1, the parts of the head 14 both at front and at rear of the transverse shank part 26 are fully visible. It will be apparent, therefore, that in using the tool in a fore and aft reciprocating motion across a work piece, it is possible to observe the cutter at all times and thus to observe with accuracy the progress of the work. When the tool is properly held and used there is no time at which the user is required to operate the tool in a "blind" manner.

Attention is directed to the symmetry of the teeth in each longitudinal direction of movement thereof. This symmetry is important from the standpoint of permitting fully effective operation on each stroke of a reciprocating movement in working with the tool. This feature serves to promote uniformity of the progress of the work and to avoid gouging of the work in one direction of movement and ineffective sliding of the cutter over the work in the other direction.

While the shape of the shank as illustrated in Fig. 1 is preferred, it will be understood that the shank may consist of a single run having the shape of a question mark or and L instead of the shape shown herein. Thus, as viewed in Fig. 1, the uppermost portion of the shank might be removed and only the lower portion of the shank extending to the cross line 62 in Fig. 1 could be provided. Such an arrangement would give the necessary full vision operation and would serve all functions of the preferred form shown. The only practical disadvantage of such a device would be lack of symmetry and lack of balance. These matters would not be serious, however, particularly if attention to balance was made in the construction of the tool and if the user exercised due care in the use of the tool for the purpose of holding the cutter in proper orientation to the work.

While the preferred embodiment of the invention has been described and illustrated herein, it will be understood that changes in the construction may be made within the scope of the appended claims without departing from the spirit of the invention.

I claim:

1. A surface treating tool comprising a handle, a shank projecting from said handle and including a pair of spaced longitudinal rigid elongated portions interconnected by a rigid transverse portion at their outer ends, a head fixedly secured to said transverse shank portion and short compared to said spaced shank portions, a cutter pivotally carried by said head and movable in its plane and substantially parallel to said spaced shank portions, and means for locking said cutter in selected angular position in said head.

2. A surface treating tool comprising a handle, a shank projecting from said handle and including a pair of spaced longitudinal rigid portions interconnected by a rigid transverse portion at their outer ends, a head secured to said transverse shank portion, said head being short compared to said spaced portions having a slot substantially parallel to said spaced shank portions, a cutter having a portion fitting in said slot, means for pivotally connecting said cutter to the head to move in the plane of said slot, and means carried by said head for locking said cutter in selected angular relation to said head.

3. A surface-treating tool comprising a handle, a rigid elongated shank including a portion at its outer end extending transversely of said shank, a slotted head shorter than said elongated shank fixed on said transverse shank portion, said head slot extending parallel to said elongated shank and at an angle to said transverse shank portion, said head having a pair of screwthreaded bores at opposite ends thereof communicating with the slot of said head, a cutter having a web portion fitting in the slot of said head and pivotally connected to said head on an axis transverse of said slot, and an adjusting screw in each bore, said screws engaging an edge of said cutter web.

4. A surface treating tool as defined in claim 1, wherein said cutter has an arcuate cutting edge substantially concentric with the pivotal axis of said cutter.

5. A surface treating tool as defined in claim 1, wherein said cutter has an arcuate cutting edge substantially concentric with the pivotal axis of said cutter and substantially radially slotted to define cutting teeth.

6. A surface treating hand tool comprising a rigid elongated shank member including a transversely extending rigid portion at one end thereof, a head shorter than said shank fixed on said transverse shank portion, a cutter, means for pivotally connecting said cutter to said head on an axis substantially parallel to said transverse shank portion, and means carried by said head for locking said cutter in selected angular relation to said head.

7. A surface treating hand tool as defined in claim 6, wherein said cutter includes an arcuate toothed portion whose teeth are defined by grooves extending substantially radially of said arcuate portion and of substantially equal width throughout.

8. A surface treating hand tool as defined in claim 6, wherein said cutter comprises a mounting portion cooperating with said connecting means and an arcuate outer portion having a plurality of substantially radial transverse slots of substantially uniform depth and uniform spacing defining cutting teeth, said teeth having similar transverse configuration.

9. A surface treating hand tool as defined in claim 6, wherein said cutter comprises a web portion cooperating with said connecting means and an arcuate outer portion of greater width than said web, said head being circumferentially grooved in uniform depth to define a plurality of spaced edge portions of similar transverse configuration, and a plurality of similar equally spaced radial slots transverse of said head to divide said edge portions into rows of similar uniformly spaced teeth.

References Cited in the file of this patent

UNITED STATES PATENTS

| | | |
|---|---|---|
| 42,397 | Peters et al. | Apr. 19, 1864 |
| 72,521 | Mershon | Dec. 24, 1867 |
| 968,745 | Dann | Aug. 30, 1910 |
| 1,266,617 | Parsons | May 21, 1918 |
| 1,572,191 | Donnelly | Feb. 9, 1926 |
| 2,106,055 | Long | Jan. 18, 1938 |
| 2,490,497 | Winfield | Dec. 6, 1949 |
| 2,543,128 | Power | Feb. 27, 1951 |
| 2,636,267 | Whitcomb | Apr. 28, 1953 |